(12) United States Patent
Nordquist et al.

(10) Patent No.: US 7,118,692 B2
(45) Date of Patent: Oct. 10, 2006

(54) SUBSTITUTED THIENOTHIOPHENE MONOMERS AND CONDUCTING POLYMERS

(75) Inventors: Andrew Francis Nordquist, Whitehall, PA (US); William Franklin Burgoyne, Jr., Bethlehem, PA (US); Steffen Zahn, Pennsburg, PA (US); Francis Joseph Waller, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 10/958,068

(22) Filed: Oct. 4, 2004

(65) Prior Publication Data

US 2006/0071200 A1    Apr. 6, 2006

(51) Int. Cl.
H01B 1/12 (2006.01)
(52) U.S. Cl. .............. 252/500; 549/35; 549/50
(58) Field of Classification Search ............. 252/500; 549/35, 50; 528/377
See application file for complete search history.

(56) References Cited

U.S. PATENT DOCUMENTS

| 4,639,328 | A |  | 1/1987 | Krause et al. |
| 4,659,503 | A |  | 4/1987 | Eidenschink et al. |
| 5,055,223 | A |  | 10/1991 | Reiffenrath et al. |
| 5,300,575 | A |  | 4/1994 | Jonas et al. |
| 5,892,244 | A |  | 4/1999 | Tanaka et al. |
| 5,998,804 | A |  | 12/1999 | Suh et al. |
| 6,585,914 | B1 |  | 7/2003 | Marks et al. |
| 6,645,401 | B1 |  | 11/2003 | Giles et al. |
| 6,676,857 | B1 |  | 1/2004 | Heeney et al. |
| 6,695,978 | B1 |  | 2/2004 | Worrall et al. |
| 6,709,808 | B1 |  | 3/2004 | Lelental et al. |
| 2003/0216476 | A1 |  | 11/2003 | Kleemann |
| 2004/0010115 | A1 | * | 1/2004 | Sotzing .............. 528/377 |
| 2004/0051084 | A1 |  | 3/2004 | Wessling et al. |
| 2004/0074779 | A1 |  | 4/2004 | Sotzing |
| 2005/0151122 | A1 | * | 7/2005 | Jiang et al .............. 252/500 |

FOREIGN PATENT DOCUMENTS

| EP | 0 144 013 | 1/1989 |
| EP | 0 568 289 A2 | 11/1993 |
| EP | 1 559 739 | 8/2005 |
| WO | WO 00/79617 | 12/2000 |

OTHER PUBLICATIONS

Pomerantz et al "Poly(2-decylthieno[3,4-b]thiophene-4,6-diyl . . . " Macromolecules 2001, 34, 1817-22.*

Neef, et al., "Synthesis and Electronic Properties of Poly (2-phenylthieno [3,4-b]thiophene): A New Low Band Gap Polymer", Chem. Matter. 1999, 11, p. 1957-1958.

Pomerantz et al "Poly(2-decylthieno[3,4b]thiophene). A New Soluble Low-Bandgap Conducting Polymer", Sythetic Metals 84 (1997), p. 243-244.

U.S. Appl. No. 10/958,054, filed Oct. 4, 2004, Zahn, Steffen et al.

Winter et al. "New acrylate systems; derivatives of B-SF5-acrylic acid"; Journal of Fluorine Chemistry; 125 (2004) p. 37-41.

Leclerc et al, Structural analysis of Poly(3-alkylthiophene)s; Makromol Chem. 190, (1989); p. 3105-3116.

U.S. Appl. No. 11/229,516, filed Sep. 20, 2005, Zahn et al.

Pomerantz M et al; "Poly(2-decylthieno [3,4-b]thiophene-4,6-diyl) A New Low Band Gas Conducting Polymer"; MACROMOLECULES 2001, vol. 34; pp. 1817-1822.

Pomerantz M. et al, "Poly(2-decylthieno [thiophene 4,6-diyl]A New Soluble Low-Bandgap Conducting Polymer"; Synthetic Metals 84 (1997) 243-244.

European Search Report completed Feb. 17, 2006.

Australian Search Report No. SG 200505895-3 dated Sep. 12, 2005.

\* cited by examiner

*Primary Examiner*—Mark Kopec
(74) *Attorney, Agent, or Firm*—Michael K. Boyer

(57) ABSTRACT

Thienothiophenes compositions comprising a $C_{3-8}$ secondary or tertiary alkyl group are disclosed. The thienothiophenes may be represented by the formula:

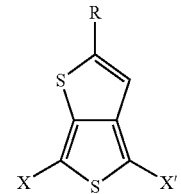

where R is $C_{3-8}$ secondary or tertiary alkyl, e.g., isopropyl, tert-butyl, tert-pentyl, isopentyl, and 2-ethylhexyl, X and X' are independently selected from the group consisting of H, halogen atoms (e.g., F, Cl, Br, and I), MgCl, MgBr, MgI, $Sn(R')_3$, (where R' is $C_{1-6}$ alkyl or $-OC_{1-6}$ alkyl), boronic acid, boronic ester, $-CH=CHR''$ (where R'' is H or $C_{1-6}$ alkyl), $-OC_{1-6}$ alkyl, $-COOC_{1-6}$ alkyl, $-S-COR'''$, $-COR'''$ (where R''' is H or $C_{1-6}$ alkyl), $-C\equiv CH$, and polymerizable aromatic rings such as phenyl, naphthalene, pyrrole, dithiophene, thienothiophene, thiophene and so forth.

7 Claims, No Drawings

SUBSTITUTED THIENOTHIOPHENE MONOMERS AND CONDUCTING POLYMERS

BACKGROUND OF THE INVENTION

Electrically conducting polymers have developed into a material of choice for a variety of organic optoelectronics applications. Such applications for optoelectronics include polymeric light emitting diodes (thin film displays), solid state lighting, organic photovolatics, advanced memory devices, organic field effect transistors, ultracapacitors and electroluminescent devices.

One of the first of many electrically conducting polymers was polyacetylene and the discovery of conductivity in such polymer created substantial interest in other types of electrically conducting polymers. Recently, conjugated poly (thiophenes) and substituted thiophene derivatives have been discovered to have electrically conducting properties. A feature of these polymers is that they can be cast into films and doped with conventional p- and n-type or the doped polymers can be cast into films and their electrical properties modified accordingly, thereby lending themselves suitable for use in a variety of optoelectronic applications.

Representative articles and patents illustrating thiophene monomers and electrically conducting polymers including thiophene and derivatives thereof are as follows:

U.S. Pat. No. 6,645,401 discloses conjugated polymers of dithienothiophene (DTT) with vinylene or acetylene connecting groups as suitable for producing semiconductors or charge transport materials useful in electrooptical and electronic devices including field effect transistors, photovoltaic, and sensor devices. Polymers containing DTT formed by electrochemical polymerization were known but had limitations in terms of solubility and photovoltaic properties.

U.S. Pat. No. 6,585,914 discloses fluorocarbon-functionalized and/or heterocyclic modified poly(thiophenes) such as α, ω-diperfluorohexylsexithiophene for use in forming films which behave as n-type semiconductor. These poly (thiophenes) also can be used to form thin film transistors with FET mobility.

U.S. Pat. No. 6,676,857 discloses polymers having polymerized units of 3-substituted-4-fluorothiophene as liquid crystal materials for use in semiconductors, charge transport materials, electrooptical field effect transistors, photovoltaic and sensor devices.

U.S. Pat. No. 6,695,978 discloses polymers of benzo[b] thiophene and bisbenzo[b]thiophene and their use as semiconductors and as charge transport materials in electrooptical devices.

U.S. Pat. No. 6,709,808 discloses image forming materials incorporating electrically conductive polymers based upon pyrrole-containing thiophene polymers and aniline containing polymers.

US 2004/00010115A1 discloses homopolymers and copolymers comprised of repeating units of thieno[3,4-b] thiophene for use in electroactive applications. Copolymers can be formed with 3,4-ethylendioxythiophene, dithiophene, pyrrole, benzothiophene, and the like.

The article, *Synthesis and Electronic Properties of Poly (2-phenyl-thieno[3,4-b]thiophene)*: A new Low Band Gap Polymer, Chem. Mater. 1999, 11, 1957–1958 discloses various thiophene polymers including poly(2-phenyl-thieno[3,4-b]thiophene) and poly(2-decyl-thieno[3,4-b]-thiophene) as conducting polymers.

The article, *Poly(2-decyl-thieno[3,4-b]thiophene): a New Soluble Low-Band Gap Conducting Polymer*, Synthetic Metals 84 (1997) 243–244 discloses various polymeric thienothiophenes including poly(2-decyl-thieno[3,4-b] thiophene) and a process for preparing the polymer.

BRIEF SUMMARY OF THE INVENTION

The invention relates thienothiophene monomers having a $C_{3-8}$ secondary or tertiary alkyl group and to conducting polymers formed by the polymerization of such monomers (polymerized units). Such polymers may find application as hole injection materials, charge transport materials, or as semiconductors, in optical, electrooptical or electronic devices, polymeric light emitting diodes (PLED), electroluminescent devices, organic field effect transistors (FET or OFET), flat panel display applications (i.e. LCD's), radio frequency identification (RFID) tags, ultracapacitors, organic photovoltaics (OPV's), sensors, in small molecule or polymer based memory devices, and in electrolytic capacitors and as hydrogen storage materetal.

Advantages may be achieved using the monomers and polymers based upon $C_{3-8}$ secondary or tertiary alkyl substituted thienothiophenes. The advantages provided by some of the monomers and polymers may include: usefulness in a wide range of electronic applications; low toxicity; environmental stability and some monomers and polymers having more positive highest occupied molecular orbitals (HOMO) than poly(thieno[3,4-b]thiophene).

DETAILED DESCRIPTION OF THE INVENTION

This invention relates to compositions of matter based upon $C_{3-8}$ secondary or tertiary alkyl substituted thieno[3, 4-b]thiophenes, and their polymers.

It has been found that $C_{3-8}$ secondary and tertiary alkyl groups pendant from thienothiophenes offer unique electrically conducting properties making them well suited for a variety of semiconductor applications. Isopropyl and tert-butyl functionality may be favored functionality.

Derivatives of the $C_{3-8}$ secondary or tertiary alkyl substituted thienothiophenes can be formed prior to or after addition of the secondary or tertiary functionality. Such compositions of matter are represented by the compounds having the formula A:

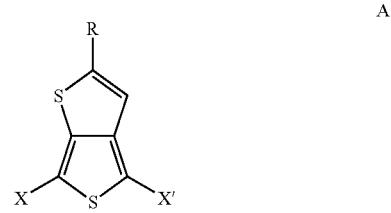

where R is $C_{3-8}$ secondary or tertiary alkyl, and X and X' are independently selected from the group consisting of H, halogen atoms, MgCl, MgBr, MgI, Sn(R')$_3$ (where R' is $C_{1-6}$ alkyl or —OC$_{1-6}$ alkyl) boronic acid, boronic ester, —CH=CHR" (where R" is H or $C_{1-6}$ alkyl), —OC$_{1-6}$ alkyl, —COOC$_{1-6}$ alkyl, —S—COR'", —COR'" (where R'" is H, or $C_{1-6}$ alkyl), —C≡CH, and polymerizable aromatic groups. Examples of secondary and tertiary alkyl groups include isopropyl, tert-butyl, isopentyl, tert-pentyl, 2-ethylhexyl, and the like. Examples of halogen atoms include F, Cl, Br, I, and the like. Examples of polymerizable aromatic groups include phenyl, naphthalene, pyrrole, dithiophene, thienothiophene, thiophene, and the like.

Preferred monomers for producing homopolymers and copolymers are those where X and X' are H and represented by the formula B:

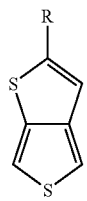

B and R is isopropyl, tert-butyl, tert-pentyl, isopentyl, or 2-ethylhexyl, preferably tert-butyl.

Electrically conducting oligomers and polymers comprised of polymerized units of monomers B are another aspect of the invention and are represented by the formula C

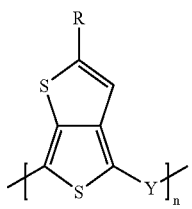

C where n is an integer, Y is —$CZ^1$=$CZ^2$— or —C≡C—, and $Z^1$ and $Z^2$ are independently H, F, Cl or CN. Oligomers often have from about 2 to 10 units and these products lend themselves to the production of memory and field effect transistor devices. Polymers having from 11 to 50,000 units, often from 20 to 10,000 units are quite useful in preparing films as hole injection materials in various electrooptical applications.

Preferred homopolymers are represented by the formula D:

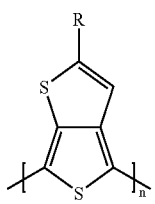

D where n is an integer as represented above and R is isopropyl, tert-butyl, tert-pentyl, isopentyl, or 2-ethylhexyl. Of particular interest are the monomer, 2-tert-butyl-thieno[3,4-b]thiophene, and oligomers and polymers comprised of polymerized units of 2-tert-butyl-thieno[3,4-b]thiophene.

Synthesis of 2-tert-butyl-thieno[3,4-b]thiophene, for example, can be effected by the 2 step process.

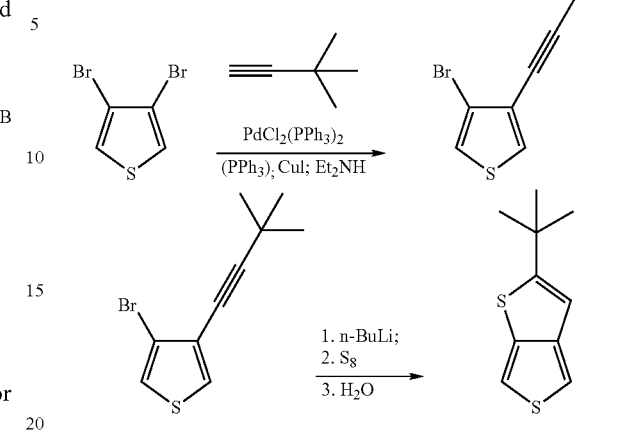

Many of the derivatives of the respective monomers where X and X' are other than H are formed post formation of the monomers. In post reaction one or both hydrogen atoms may be replaced with other functional groups. Alternatively, some of the derivatives may be formed, ab initio, by converting thiophene to the derivative and then undergoing the 2 step reaction procedure where X and X' are compatible with the chemistries outlined in steps 1–2 above.

Polymerization of the secondary and tert-alkyl-thieno[3,4-b]thiophene monomers can be effected utilizing an aqueous phase polymerization method wherein the monomer 2-tert-butyl-thieno[3,4-b]thiophene, for example, a polyanion and an oxidant are reacted in the presence of water under reaction conditions sufficient to form the homopolymer, e.g., poly(2-tert-butyl-thieno[3,4-b]thiophene). By this polymerization process, the resulting polymer may be polymerized and doped in a single step.

The amount of polyanion and oxidant to be employed in the aqueous polymerization method may broadly vary and can be determined for any given polymerization without undue experimentation. For example the weight ratio of 2-secondary or tertiary-alkyl-thieno[3,4-b]thiophene monomer to a desired polyanion typically ranges from 0.001 to 50, preferably 0.05 to 2.0. The mole ratio of 2-secondary or tertiary-alkyl-thieno[3,4-b]thiophene monomer to a desired oxidant typically ranges from 0.01 to 10 preferably 0.1 to 2.5. For example, when ferric sulfate is used as the oxidant, the amount used ranges from 0.1 to 5 of 2-secondary or tertiary-alkyl-thieno[3,4-b]thiophene. thiophene. The nature of the oxidant may be varied in order to address variants in the ionization potential of the utilized monomers. Various Fe(II)/Fe(III) couplets are known that display different potential depending on their respective ligands, e.g., $FeCl_3$; $Fe_2(S_2O_8)_3$; $Fe(phen)_3$. If weaker oxidants are required Cu based couplets may be considered. If stronger oxidants are needed Co based couplets should be considered.

Strong oxidants are employed in the polymerization process. Persulfates and iron (III) salts of organic acids and inorganic acids containing organic residues are preferred because they are not corrosive. Examples of iron (III) salts of organic acids are the Fe(III) salts of $C_{1-30}$ alkyl sulfonic acids, such as methane or dodecane sulfonic acid; aliphatic $C_{1-20}$ carboxylic acids, such as 2-ethylhexylcarboxylic acid, aliphatic perfluorocarboxylic acids, such as trifluoroacetic acid and perfluorooctanoic acid; aliphatic dicarboxylic acids, such as oxalic acid and, aromatic, optionally $C_{1-20}$- alkyl-substituted sulfonic acids, such as benzenesulfonic acid, p-toluene-sulfonic acid and dodecyl benzenesulfonic acid. Specific examples of iron salts include $FeCl_3$, $Fe_2(SO_4)_3$, $Fe(ClO_4)_3$ and $Fe_2(S_2O_8)_3$. Other oxidants include $H_2O_2$, $K_2Cr_2O_7$, ammonium persulfate, potassium permanganate, copper tetrafluoroborate, iodine, air and oxygen.

Suitable polyanions include an anion of a polycarboxylic acid, such as polyacrylic acid, polymethacrylic acid, Nafion®, polymaleic acid, and polymeric sulfonic acids, such as polystyrene sulfonic acid and polyvinyl sulfonic acid. The polycarboxylic and polysulfonic acids may also be copolymers of vinyl carboxylic and vinyl sulfonic acids with other monomers, such as acrylates and styrene. The molecular weight of the acids supplying the polyanions is preferably in the range from 1,000 to 500,000, preferably from 2000 to 500,000 and most preferably about 200,000.

Monomers of the formula A lend themselves to metal-catalyzed polymerizations as described in the open literature. Conditions can vary depending on the nature the X and X' substituents.

A method for preparing oligomers and polymers, most preferably, poly(2-tert-butyl-thieno[3,4-b]thiophene), involves an electrochemical process wherein 2-tert-butyl-thieno[3,4-b]thiophene is polymerized in an electrochemical cell using a three electrode configuration. A suitable three electrode configuration comprises a button working electrode selected from the group consisting of platinum, gold and vitreous carbon button working electrodes, a platinum flag counter electrode and an Ag/Ag+ non-aqueous reference electrode. Suitable electrolytes are selected from the group consisting of tetrabutylammonium perchlorate/acetonitrile, lithium triflate/acetonitrile and tetrabutylammonium hexafluorophosphate/acetonitrile.

Films of the $C_{3-8}$ secondary or tertiary alkyl substituted thienothiophene oligomers and polymers may be doped with conventional p- and n- type dopants post polymerization of the respective monomers. The doping process typically involves treatment of the film semiconductor material with an oxidizing or reducing agent in a redox reaction to form delocalized ionic centers in the material, with the corresponding counterions derived from the applied dopants. Doping methods comprise for example exposure to a doping vapor in the atmospheric or at a reduced pressure, electrochemical doping in a solution containing a dopant, bringing the dopant in contact with the semiconductor material to be thermally diffused, and ion-implantation of the dopant into the semiconductor material.

Conductive polymeric films having holes (p-doped) can be formed via conventional p-dopants which include halogen atoms, e.g., $I_2$, $Cl_2$, $Br_2$, ICl, $ICl_3$, IBr and IF, Lewis acids, e.g., $PF_5$, $AsF_5$, $SbF_5$, $BF_3$, $BCl_3$, $SbCl_5$, $BBr_3$ and $SO_3$, protonic acids, organic acids, or amino acids, e.g., HF, HCl, $HNO_3$, $H_2SO_4$, $HClO_4$, $FSO_3H$ and $ClSO_3H$, transition metal compounds, e.g., $FeCl_3$, $Fe(OCl)_3$, $Fe(ClO_4)_3$, $Fe(4-CH_3C_6H_4SO_3)_3$, $TiCl_4$, $ZrCl_4$, $HfCl_4$, $NbF_5$, $NbCl_5$, $TaCl_5$, $MoF_5$, $MoCl_5$, $WF_5$, $WCl_6$, $UF_6$ and $LnX_3$ wherein Ln is a lanthanoid and X is an anion, e.g., $Cl^-$, $Br^-$, $I^-$, $I_3^-$, $HSO_4^-$, $SO_4^{2-}$, $NO_3^-$, $ClO_4^-$, $BF_4^-$, $B_{12}F_{12}^{2-}$, $PF_6^-$, $AsF_6^-$, $SbF_6^-$, $FeCl_4^-$, $Fe(CN)_6^{3-}$, and anions of various sulfonic acids, such as aryl-$SO_3^-$. Also, $O_2$, as well as $O_3$, may be used.

Conductive polymeric films employing electrons as carriers as in n-doped polymeric films utilize conventional n-dopants which include the alkali metals (e.g., Li, Na, K, Rb, and Cs), alkaline-earth metals e.g., Ca, Sr, and Ba., The $C_{3-8}$ secondary or tertiary alkyl substituted thieno[3,4-b]thiophenes, such as 2-tert-butyl-thieno[3,4-b]thiophene and derivatives can be copolymerized with other polymerizable monomers capable of forming electrically conductive polymers. Such monomers include benzo- and bisbenzothiophenes, thienothiophenes, thiophenes, dithienothiophenes, pyridylthiophenes, substituted thiophenes, substituted thieno[3,4-b]thiophenes, dithieno[3,4-b:3',4'-d]thiophene, pyrroles, bithiophenes, substituted pyrroles, phenylene, substituted phenylenes, naphthalene, substituted naphthalenes, biphenyl and terphenyl and their substituted versions, phenylene vinylene and substituted phenylene vinylene. Other monomers are described in U.S. Pat. Nos. 4,959,430, and 4,910,645 and such monomers are incorporated by reference.

In processing oligomers and polymers of $C_{3-8}$ secondary or tertiary alkyl substituted thieno[3,4-b]thiophenes, such as 2-tert-butyl-thieno[3,4-b]thiophene and derivatives, additives such as ethylene glycol, diethylene glycol, mannitol, propylene 1,3-glycol, butane 1,4-glycol, N-methylpyrrolidone, sorbitol, glycerol, propylene carbonate and other appropriate high boiling organics can be added to dispersions to improve conductivity of the films prepared from these dispersions. Other common additives for tailoring electrically conductive polymers can be employed as desired and these include antioxidants, UV stabilizers, surfactants, and conductive fillers such as particulate copper, silver, nickel, aluminum, carbon black and the like. Non-conductive fillers such as talc, mica, wollastonite, silica, clay, $TiO_2$, dyes, pigments and the like can also be incorporated to promote specific properties such as increased modulus, surface hardness, surface color and the like.

The following examples are provided to illustrate various embodiments and comparisons and are not intended to restrict the scope of the invention.

EXAMPLE 1

The compound 2-tert-butylthieno[3,4-b]thiophene is prepared by a two step procedure in the manner described.

Step 1

Preparation of 3-bromo-4-(3,3-dimethyl-but-1-ynyl)-thiophene

A 1-liter round-bottomed, three-necked flask was equipped with a reflux condenser, a mechanical stirrer, and a thermocouple, and static dry nitrogen gas inlet. The flask was then charged with 60 g diethylamine (which had previously been dried over powdered KOH and filtered), 96.76 g (0.40 mol.) 3,4-dibromothiophene, 500 mg (0.7 mmol) of dichlorobis(triphenylphosphine)palladium(II), 200 mg (0.76 mmol) triphenylphosphine, 150 mg (1.37 mmol) of copper (I)iodide, and 25.0 g (0.304 mol.) 3,3-dimethyl-1-butyne. The stirred mixture was heated to reflux for 7 hrs. The initial temperature was ca. 65° C. After 6.0 hrs, the temperature was ca. 70°C.

The reaction mixture was cooled to room temperature, and the diethylamine was removed by evaporation on a roto-evaporator. A 600 mL portion of mixed hexanes was added to the residual product of reaction, along with 10 g of activated carbon (Darco 12–20 mesh). The mixture was stirred for 4 hrs, then filtered through a 100 g silica gel column. The hexane solvent was removed from the solution via evaporation on a roto-evaporator. The crude product had a mass of 91.57 g. The residual liquid was fractionally distilled through a 25 cm vacuum-jacketed column, packed with glass helices, under vacuum. 37.99 g of unreacted 3,4-dibromothiophene (bp 40° C./0.45 mm Hg) and 34.07 g of 3-bromo-4-(3,3-dimethyl-but-1-ynyl)-thiophene (bp: 60° C./0.75 mm Hg) were isolated, which was a 46% isolated yield based on 3,3-dimethyl-1-butyne.

Step 2

Preparation of 2-tert-butylthieno[3,4-b]thiophene

Preparation:

A 1 L round-bottomed, three-necked flask was equipped with a septum port, a valved vent, a magnetic stirrer, a thermometer, and dry nitrogen gas inlet. The oven dried system was charged at room temperature with 500 mL of diethyl ether, and 46.8 g (0.193 mol) 3-bromo-4-(3,3-dimethyl-but-1-ynyl)-thiophene. After cooling to −74° C. in a dry ice/acetone bath, 80 mL of 2.5M n-butyl lithium in hexane was added over 25 minutes, with a resulting temperature rise to −70° C. The reaction was warmed to −10° C. over 2 hours, followed by cooling to −30° C., at which time 6.54 g (0.204 mol) of sulfur was rapidly added and the temperature rose to −5° C. After 1 h at −5° C. the reaction was cooled to −60° C. After 1 hr at −60° C., the contents of the flask were transferred to a separatory funnel and extracted twice, each time with 500 mL of ice cold water, removing the (partially frozen) aqueous phase from the ether phase within 2 minutes. After setting at room temperature for 16 h under nitrogen, the aqueous phase was extracted 4 times, each time with a volume of ether. The combined ether phases were dried over 50 g of magnesium sulfate, filtered and the ether removed by rotary evaporation in a 55° C. bath. The concentrate was cooled to 0° C. before being exposed to air, and Kugelrohr distilled at 70° C. and 0.12 torr, and thereafter handled under nitrogen. Distillate (27.0 g) was 98.9% 2-tert-butylthieno[3,4-b]thiophene (71% yield). The Kugelrohr distilled product was recrystallized from heptane at −15 to −20 ° C., producing 23.1 g, purity 99.4%, of 2-tert-butylthieno[3,4-b]thiophene (61% yield).

EXAMPLE 2

Toxicity Comparison Between thieno[3,4-b]thiophene and 2-tert-butyl-thieno[3,4-b]thiophene Thieno[3,4-b]thiophene displayed in toxicity testing an oral LD50 of 50 mg/kg and a dermal LD50 of 200–400mg/kg. 2-tert-butyl-thieno[3,4-b]thiophene on the other hand showed surprisingly lower toxicity. 2-tert-butyl-thieno[3,4-b]thiophene displayed in toxicity testing an oral LD50 of >500mg/kg and a dermal LD50 of >400mg/kg.

EXAMPLE 3

Chemical Polymerization of 2-tert-butyl-thieno[3,4-b]thiophene 2-tert-butylthieno[3,4-b]thiophene (0.3 g,1.53 mmol) and imidazole (0.178 g, 2.26 mmol) were dissolved in 6 mL of n-butanol and the resulting solution was filtered through a 0.45 μm filter. Iron(III) tris-p-toluenesulfonate (2.3 g, 3.387 mmol) was dissolved in 5 mL of n-butanol and the resulting solution was filtered through a 0.45 μm filter. Both solutions were combined shortly before spin-coating them onto glass substrates (typically 2.5×2.5 cm) at 1000 rpm for 1 minute. The use of iron(III) tris-p-toluenesulfonate is advantageous because it does not crystallize. After coating, the films were dried and baked (30 min, 110° C.) in a convection furnace. After cooling down to room temperature the films were washed several times with n-butanol and deionized water to extract iron(II) salts formed at polymerization. The thickness of the films was determined to be 180 nm by profilometry. The conductivity of the resulting films varied between $1.18*10^{-2}$ S/cm and $2.37*10^{-3}$ S/cm. The Vis-NIR spectrum displays the low band gap nature of the formed poly(2-tert-butyl-thieno[3,4-b]thiophene).

EXAMPLE 4

Electrochemical Polymerization of 2-tert-butyl-thieno[3,4-b]thiophene

Films of poly(2-tert-butyl-thieno[3,4-b]thiophene) were generated through CV (cyclic voltammetry) growth. Films were grown in a standard three-electrode cell equipped with a Pt-flag (1 cm$^2$) counter electrode, a non-aqueous Ag/Ag$^+$ reference electrode, and a Pt button working electrode. The electrolyte was 0.1M Bu$_4$NPF$_6$ in MeCN. 2-tert-butylthieno[3,4-b]thiophene) was 0.01M. The experiment was carried out under a blanket of nitrogen. In general, films were grown by cycling from the 1.2V to −0.8V 10 times. The CV experiment was initiated from the open circuit potential. Polymerization was apparent from the current response increase in regular intervals at a lower redox potential upon repetitive scans.

EXAMPLE 5

Evaluation Profile on Pt Electrode of Poly(2-tert-butyl-thieno[3,4-b]thiophene)

Films of poly(2-tert-butyl-thieno[3,4-b]thiophene) generated as described under Example 4 were evaluated by CV. The freshly grown film was transferred to a fresh monomer-free electrolyte solution being 0.1M Bu$_4$NPF$_6$ in MeCN. The standard three-electrode cell equipped with a Pt-flag (1 cm$^2$) counter electrode, a non-aqueous Ag/Ag$^+$ reference electrode, and a Pt button working electrode covered with poly(2-tert-butyl-thieno[3,4-b]thiophene) were utilized. The experiment was carried out under a blanket of nitrogen. The CV was started at the open circuit potential scanning positive. The potential window was scanned from 0.6V to −1.85V five times. The HOMO value was determined from the onset of the oxidation of poly(2-tert-butyl-thieno[3,4-b]thiophene) in a cyclic voltammetry experiment. The band gap was determined from difference of the onset of the oxidation and the onset of the reduction of poly(2-tert-butyl-thieno[3,4-b]thiophene) in a cyclic voltammetry experiment.

Experimental HOMO and Band Gap Data for poly(2-tert-butyl-thieno[3,4-b]thiophene):

|  | Experimental |
| --- | --- |
| HOMO (eV) | −4.91 |
| Band Gap (eV) | ~0.70 |

The tert-butyl substituted thienothiophenes and their conjugated oligomers and polymers show better properties compared to their hydrogen, decyl and phenyl analogs. The monomer 2-tert-butyl-thieno[3,4-b]thiophene displayed significantly more favorable toxicity properties compared to thieno[3,4-b]thiophene. Poly(2-tert-butyl-thieno[3,4-b]

thiophene)'s band gap (0.7 eV) is also lower compared to poly(thieno[3,4-b]thiophene) (0.85 eV –1.1 eV), poly(2-decyl-thieno[3,4-b]thiophene (1.2 eV), and poly(2-phenyl-thieno[3,4-b]thiophene) (0.85 eV). Furthermore, the more positive HOMO level relative to poly(thieno[3,4-b]thiophene) is a beneficial parameter for some optoelectronic applications. The monomer 2-tert-butyl-thieno[3,4-b]thiophene is readily soluble in a wide variety of solvents allowing for a wide variety of processing conditions as compared to 2-phenyl-thieno[3,4-b]thiophene is only sparingly soluble.

It is expected that one or more of the beneficial properties shown for 2-phenyl-thieno[3,4-b]thiophene and poly(2-tert-butyl-thieno[3,4-b]thiophene) as shown in the examples above will be provided by the other monomers and polymers of this invention.

The invention has been described with reference to particular embodiments, but other embodiments are apparent to persons of skill in the art, and are included within the scope of the claims.

The invention claimed is:

1. A thienothiophene composition comprising:

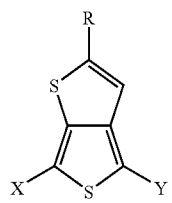

where R comprises at least one member selected from the group consisting of isopropyl, tert-butyl, tert-pentyl, isopentyl, and 2-ethylhexyl, Y comprises at least one of —CZ$^1$=CZ$^2$— or —C≡C—, and Z$^1$ and Z$^2$ are independently selected from H, F, Cl or CN, X comprises at least one member selected from the group consisting of H, halogen atoms, MgCl, MgBr, MgI, Sn(R')$_3$ (where R' is C$_{1-6}$ alkyl or —OC$_{1-6}$ alkyl) boronic acid, boronic ester, CH=CHR" (where R" is H or C$_{1-6}$ alkyl), —OC$_{1-6}$ alkyl, —COOC$_{1-6}$ alkyl, —S—COR''', COR''' (where R''' is H, or C$_{1-6}$ alkyl), —C≡CH, and polymerizable aromatic groups.

2. The thienothiophene composition of claim 1 wherein X comprises at least one member selected from the group consisting of Sn(R')$_3$ (where R' is C$_{1-6}$ alkyl or —OC$_{1-6}$ alkyl), —CH=CHR" (where R" is H or C$_{1-6}$alkyl), —OC$_{1-6}$ alkyl, —COOC$_{1-6}$ alkyl, —S—COR''', —COR''' (where R''' is H, or C$_{1-6}$ alkyl), —C≡CH, and polymerizable aromatic groups.

3. An electrically conducting polymer comprised of polymerized units of the compound represented by the formula:

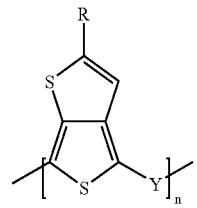

where R comprises C$_{3-8}$ secondary or tertiary alkyl, n is an integer, Y comprises at least one member selected from the group consisting of —CZ$^1$=CZ$^2$— or —C≡C—, and Z$^1$ and Z$^2$ are independently selected from H, F, Cl or CN—.

4. An electrically conducting polymer comprised of polymerized units of the compound represented by the formula:

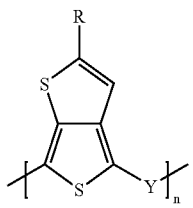

where R comprises at least one member selected from the group consisting of isopropyl, tert-butyl, tert-pentyl, isopentyl, and 2-ethylhexyl, n is an integer, Y is —CZ$^1$=CZ$^2$— or —C≡C—, and Z$^1$ and Z$^2$ are independently selected from H, F, Cl or CN—.

5. The polymer of claim 4 wherein n is an integer from 2 to 50,000 units.

6. The polymer of claim 4 wherein Y is —CH=CR"— and R" is H.

7. The polymer of claim 4 wherein Y is —C≡C—.

* * * * *

UNITED STATES PATENT AND TRADEMARK OFFICE
CERTIFICATE OF CORRECTION

| | | |
|---|---|---|
| PATENT NO. | : 7,118,692 B2 | Page 1 of 1 |
| APPLICATION NO. | : 10/958068 | |
| DATED | : October 10, 2006 | |
| INVENTOR(S) | : Andrew Francis Nordquist et al. | |

It is certified that error appears in the above-identified patent and that said Letters Patent is hereby corrected as shown below:

Column 9, Claim 1, Line 41
   add a minus sign -- - -- before "CH=CHR"

Signed and Sealed this

Nineteenth Day of December, 2006

JON W. DUDAS
*Director of the United States Patent and Trademark Office*